(12) United States Patent
Keegan

(10) Patent No.: US 7,255,565 B2
(45) Date of Patent: Aug. 14, 2007

(54) ANTHROPOMORPHIC PHANTOMS AND METHOD

(76) Inventor: Brian Keegan, 6200 - 111th Ave. NE., Kirkland, WA (US) 98033

( * ) Notice: Subject to any disclaimer, the term of this patent is extended or adjusted under 35 U.S.C. 154(b) by 401 days.

(21) Appl. No.: 10/800,956

(22) Filed: Mar. 15, 2004

(65) Prior Publication Data
US 2005/0202381 A1 Sep. 15, 2005

(51) Int. Cl.
G09B 23/28 (2006.01)
(52) U.S. Cl. .................. 434/272; 434/267
(58) Field of Classification Search ........... 73/1.86; 434/262, 267, 268, 270, 271, 272, 273, 274
See application file for complete search history.

(56) References Cited

U.S. PATENT DOCUMENTS

| | | | | |
|---|---|---|---|---|
| 3,789,518 A * | 2/1974 | Chase | ................ | 434/272 |
| 4,182,054 A * | 1/1980 | Wise et al. | ................ | 434/268 |
| 4,277,367 A | 7/1981 | Madsen et al. | ............. | 252/408 |
| 4,286,168 A * | 8/1981 | Carr | ................ | 250/505.1 |
| 4,286,455 A | 9/1981 | Ophir et al. | ................ | 73/1 |
| 4,493,653 A * | 1/1985 | Robbins et al. | ............. | 434/262 |
| 4,974,461 A | 12/1990 | Smith et al. | ................ | 73/865.6 |
| 5,061,187 A | 10/1991 | Jerath | ................ | 434/262 |
| 5,236,363 A * | 8/1993 | Sandrik et al. | ............. | 434/267 |
| 5,419,706 A * | 5/1995 | Levy et al. | ................ | 434/409 |
| 5,625,137 A | 4/1997 | Madsen et al. | ............. | 73/1.84 |
| 5,839,904 A * | 11/1998 | Bloom | ................ | 434/268 |
| 5,902,748 A | 5/1999 | Madsen et al. | ................ | 436/8 |
| 6,083,008 A * | 7/2000 | Yamada et al. | ............. | 434/267 |
| 6,190,915 B1 | 2/2001 | Madsen et al. | ................ | 436/8 |
| 6,205,871 B1 * | 3/2001 | Saloner et al. | ............. | 73/866.4 |
| 6,318,146 B1 | 11/2001 | Madsen et al. | ............. | 73/1.86 |
| 6,352,860 B1 | 3/2002 | Madsen et al. | ................ | 436/8 |
| 6,471,519 B1 * | 10/2002 | Biermann et al. | .......... | 434/274 |
| 7,059,168 B2 * | 6/2006 | Hibi et al. | ................ | 73/1.86 |
| 2004/0126746 A1 * | 7/2004 | Toly | ........................ | 434/262 |

FOREIGN PATENT DOCUMENTS

GB    2047101    * 11/1980

* cited by examiner

Primary Examiner—Kurt Fernstrom
(74) Attorney, Agent, or Firm—Dean A. Craine

(57) ABSTRACT

An anthropomorphic phantom used as a training tool by healthcare workers for learning ultrasonic imaging procedures. The phantom is made of a moldable, elastomeric tissue-simulating chemical composition that may be easily processed to create an anthropomorphic phantom: that has the "look and feel" and self-sealing characteristics of human tissue. During the mixing processes, scattering agents and pigments may be added to provide a phantom that simulates the sonographic characteristics on living tissue. The phantom body may contain objects and empty or liquid filled cavities and conduits that simulate normal internal structures and abnormal artifacts and conditions. In one embodiment, hollow rods are disposed longitudinally inside the primary mold that forms blood vessels inside the phantom. When the phantom is removed from the primary mold, the hollow rods are removed thereby forming a hollow conduit. Two plugs may be inserted into the ends of the conduit to hold a blood simulating liquid placed inside the conduit.

23 Claims, 7 Drawing Sheets

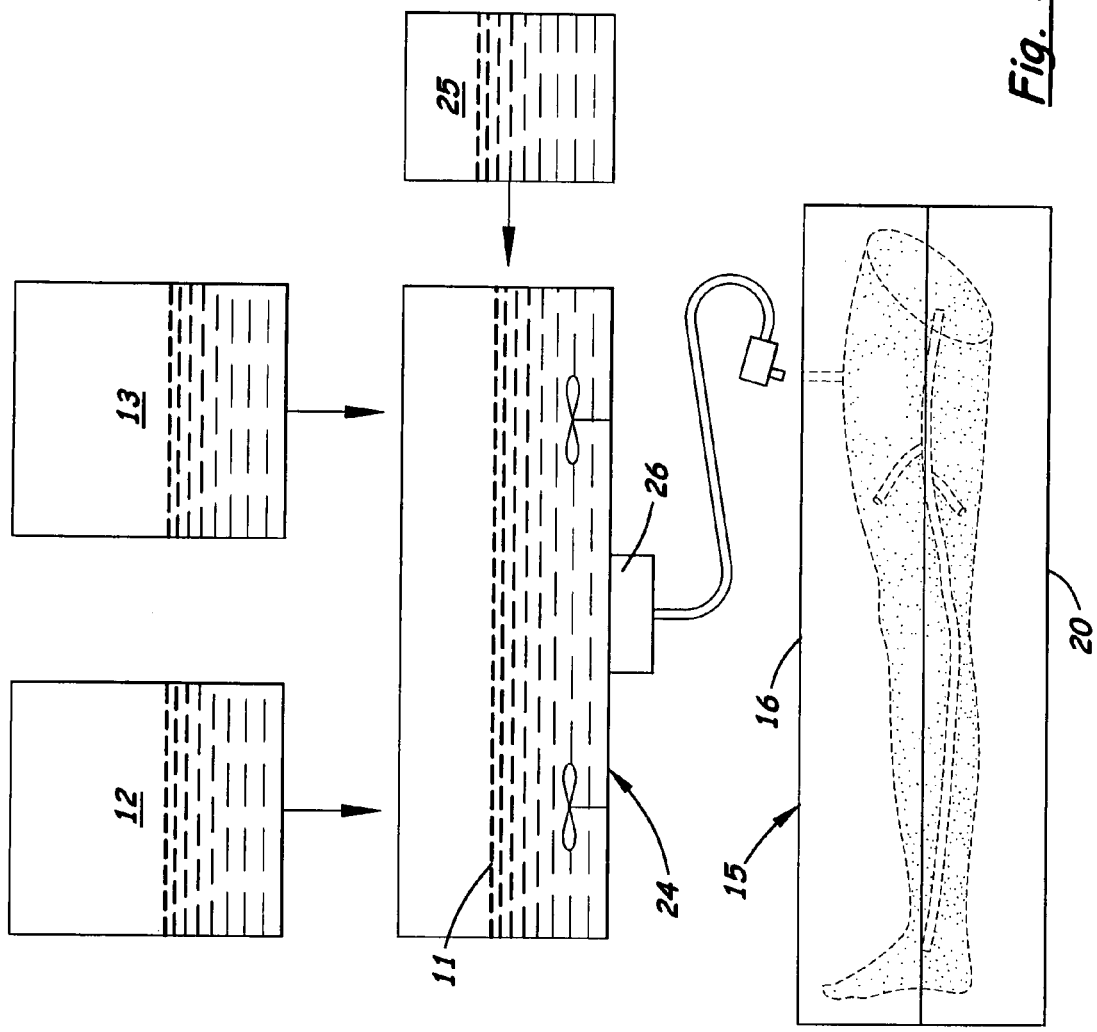

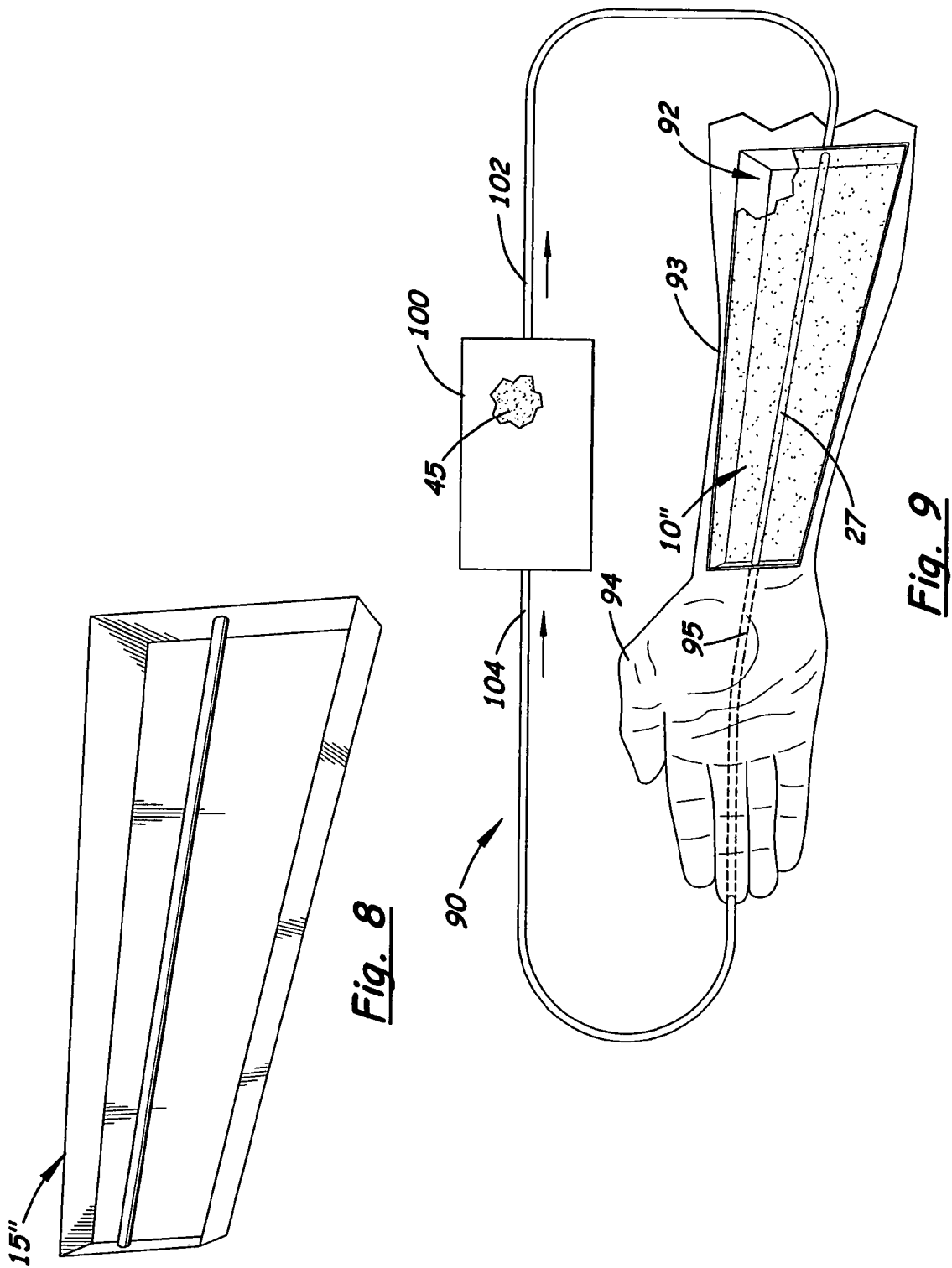

ANTHROPOMORPHIC PHANTOMS AND METHOD

BACKGROUND OF THE INVENTION

1. Field of the Invention

The present invention relates to the field of ultrasound imaging devices including diagnostic medical ultrasound, continuous wave Doppler, pulsed Doppler, duplex Doppler/imaging systems, color power Doppler, color-flow Doppler and methods for using them in medical imaging and other such applications. More particularly, this invention relates to phantoms used to assess the performance of ultrasound imaging devices, to measure quality assurance, and to teach ultrasound imaging and medical ultrasound guided techniques.

2. Description of the Related Art

Medical ultrasound imaging is used in a variety of different medical procedures. Among its applications is its use as a diagnostic testing modality and a method of guiding invasive procedures. Heretofore, ultrasound-imaging procedures have traditionally been performed by technicians and interpreted by physicians within radiology departments. Today, such procedures may be performed in outpatient clinics, hospital specialty care units, assisted care facilities, and in patient's homes by qualified nurses, technicians, and physicians.

A successful medical ultrasound imaging procedure should cause minimal patient injury and discomfort. Factors that determine whether a procedure is successful include the healthcare worker's skill level, his or her ability to properly interpret and identify normal and abnormal anatomic structures and artifacts displayed during the procedure, and his or her understanding of the limitations of the ultrasonic imaging equipment system.

It is very important for a healthcare worker who performs an ultrasonic imaging procedure to be adequately trained. Today, hands-on training is carried out on cadavers, animals, consenting patients, and on phantoms designed to simulate human tissue. Unfortunately, cadavers, animals, and consenting patients are not widely available for training.

One drawback with ultrasonic phantoms found in the prior art is that they do not have the "look and feel" of human tissue during an ultrasonic imaging procedure. A second drawback is that they are not self-sealing after puncturing with a cannula or needle, thereby limiting their number of uses. A third drawback is that they do not include internal structures designed to simulate normal and abnormal anatomical structures typically found during an ultrasonic imaging procedure on human tissue. A fourth drawback is that they are susceptible to mold growth and quickly dry out when exposed to air for extended periods.

SUMMARY OF THE INVENTION

It is an object of the present invention to provide an improved anthropomorphic, ultrasonic phantom that has the appearance and the "look and feel" of living human tissue when used during an ultrasonic imaging procedure.

It is the object of the present invention to provide an ultrasonic phantom that utilizes conduits within the material to simulate blood vessels.

It is another object of the present invention to provide such an ultrasonic phantom that may include scattering agents that simulate the sonographic characteristics of living human tissue.

It is another object of the present invention to provide such an ultrasonic phantom that may include optional internal structures that simulate both normal and abnormal anatomical structures or conditions found in living human tissue.

It is further object of the present invention to provide a method of manufacturing an ultrasonic phantom into any desirable anatomical structure upon which an ultrasonic imaging procedure is performed.

It is a still further object of the present invention to provide such an ultrasonic phantom that is self-sealing when punctured during an ultrasonic imaging procedure, not susceptible to mold growth and does not dry out when exposed to air and room temperatures for relative periods.

These and other objects of the present invention are met by the anthropomorphic phantom disclosed herein made of a moldable chemical composition that closely simulates living human tissue during an ultrasonic imaging procedure. The chemical composition is made of two thermoplastic elastomers, which are melted, slowly mixed together and then poured into a rigid primary mold. The primary mold is designed to produce a realistic anatomical structure or a section of tissue placed into a plastic anatomical model. When the chemical composition cools and cures, it has self-sealing characteristics that allow repeated punctures by a needle or cannula thereby making it ideal for use as a training tool for ultrasonic imaging training. The chemical composition is also mold resistant and is relatively stable at room temperature for long periods.

When heated, the chemical composition has sufficient viscosity to evenly suspend varying amounts of scattering agent throughout the entire phantom. During manufacturing, the amount of scattering agent added to the mixture is selectively adjusted to produce a phantom that has the "look and feel" of real human tissue. Because the phantom is prepared by a molding process, various internal objects, cavities, and conduits may be formed inside phantom that simulate either normal or abnormal structures and conditions commonly detected in human tissue. The internal cavities and conduits are formed by placing a removable secondary mold inside the primary mold. After the chemical composition has cured, the secondary forms are removed, thereby forming an empty cavity or conduit inside the phantom. Later, the cavities and conduits may be filled with a fluid or material that simulates the natural fluid or material.

Also disclosed herein is a method of manufacturing the above-described phantom.

DESCRIPTION OF THE DRAWINGS

FIG. 5. is a diagram that shows the thermoplastic elastomers and a scattering agent being added to a mixing tank to produce the chemical composition used to manufacture the phantom.

FIG. 8 is a perspective view of the primary mold used to manufacture a phantom that is used with an arm model shown in FIG. 9.

FIG. 9 is a perspective view of an arm model with the phantom produced by the primary mold shown in FIG. 8.

DESCRIPTION OF THE PREFERRED EMBODIMENT(S)

Figure 1:
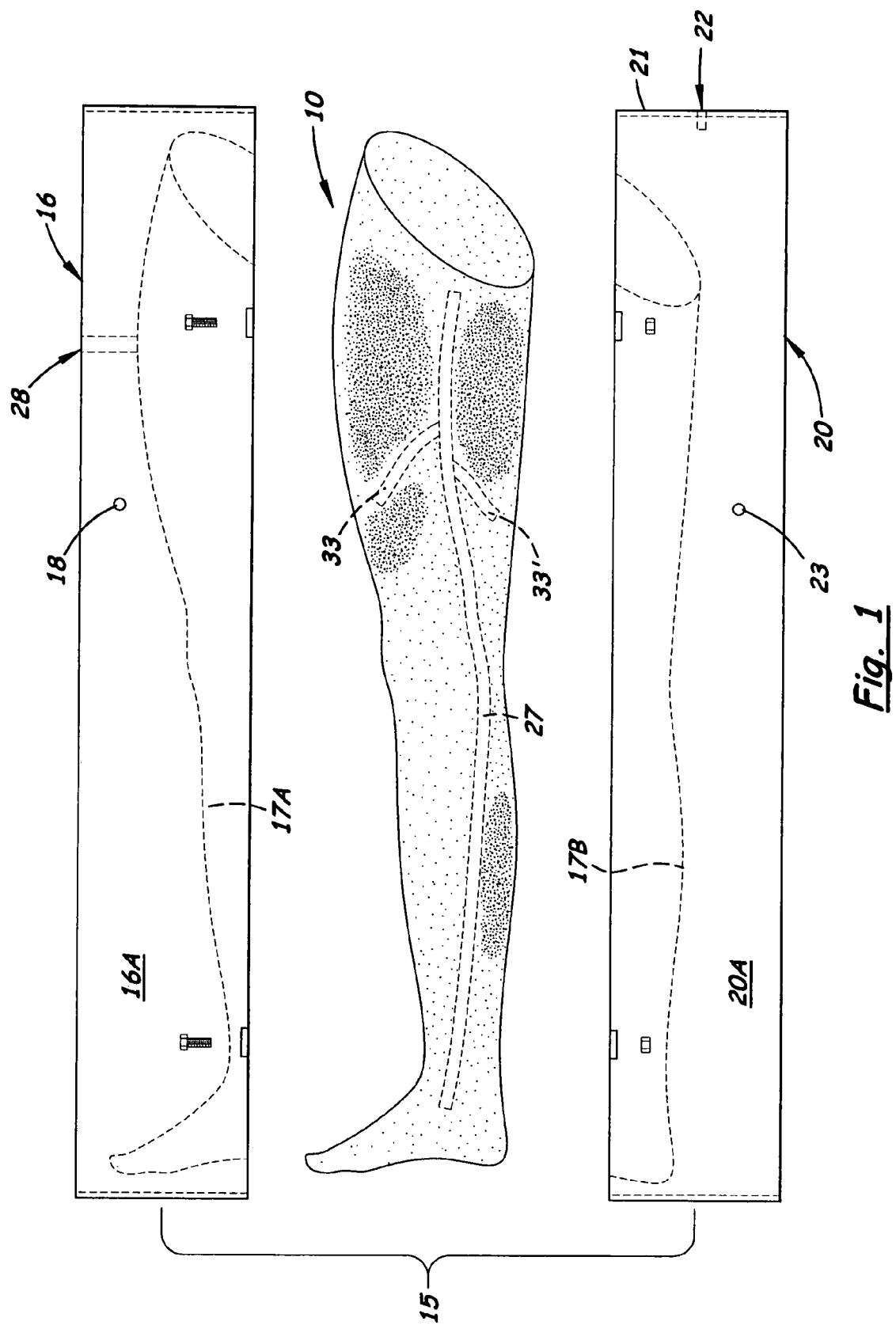
FIG. 1 is a side elevational view of a leg-shaped ultrasonic phantom shown between two mold members that are joined together to make a primary mold.

Referring to the FIGS., there is shown an anthropomorphic phantom 10 disclosed herein made of a chemical composition 11 that has the 'look and feel' of human tissue during an ultrasonic imaging procedure. The chemical composition 11 is made of moldable material. thereby enabling the phantom to be formed in a wide variety of different anatomical structures. Although the chemical composition 11 is substantially non-reflective during an ultrasonic image procedure, varying amounts of a scattering agent 25 may be added to the chemical composition 11 thereby enabling the manufacturer to adjust the sonographic characteristics of the chemical composition 11 to more closely mimic human tissue.

In the preferred embodiment, the chemical composition 11 are thermoplastic elastomers 12, 13 that are melted and then poured into a rigid primary mold 15. The thermoplastic elastomers 12, 13 are commercially available compositions comprised in part of highly plasticized styrene, ethylene, butylene, styrene block copolymers. The individual elastomers 12, 13 are sold under the trademarks TOUGH GRADE and EASY POUR, respectively, by Sutton Industries of North East, Md. While Sutton Technologies makes appropriate thermoplastic elastomers for the invention, multiple mixes can be used. The two thermoplastic elastomers 12, 13 are heated, mixed together in a 60:30 ratio. For practical purposes, the term thermoplastic elastomers is defined as a material which has rubber like, stretchy qualities i.e. easily returns to its original shape when stretched and which can be melted and molded at sufficient temperature.

The rigid primary mold 15 is made of two mold members 16 and 20 with two inside, complimentary-shaped casting surfaces 17A, 17B formed therein, respectively. FIG. 1 shows the two mold members 16, 20 longitudinally aligned, registered and joined together to form a leg producing primary mold 15. As discussed further below, each mold member 16, 20 includes an outer shell 16A, 20A and at least one end plate 19 and 21, respectively. The casting surfaces 17A, 17B on the mold members 16, 20, respectively, form the anterior and posterior surfaces, respectively, on the phantom 10.

The thermoplastic elastomers 12, 13 are semi-solids at room temperature and become fluidic at temp above approximately 145 degrees C. Heating may be accomplished using ovens, heated vats, and open pans. Most preferably, a heated tank 24 with a piston pump 26 dispensing mechanism sold by Nordson, Inc. of Duluth, Minn. is used to heat and dispense the thermoplastic elastomers 12, 13. When the two thermoplastic elastomers 12, 13 are melted they are slowly and thoroughly mixed with a scattering agent 25 in the heated tank 24 so that air bubbles are not introduced. After being thoroughly mixed together, the mixture of thermoplastic elastomers 12, 13 and scattering agent 25 is slowly poured into a fill opening 28 formed on the mold member (mold member 16 shown).

The scattering agent 25 added to the elastomers 12, 13 imparts sonographic characteristics to the chemical composition 11 that simulate the sonographic characteristics of living human tissue. It is widely known that scattering of the ultrasound occurs when an incident wave is reflected in many directions after interacting with a structure whose dimensions are similar to or less than the wavelength of the ultrasound. The distribution of the scattered ultrasound is critically dependent on the dimensions of the target compared to the wavelength.

In the embodiments disclosed herein, the total amount of scattering agent 25 added to the chemical composition 11 is selectively adjusted depending on the type of anatomical structure the phantom 10 represents. Examples of the scattering agent 25 include but not limited to talcum powder, graphite powder, and glass spheres. In the preferred embodiment, talcum powder is used as a scattering agent because of its ready availability and low cost. Typically, talcum powder is added in a concentration of 0.5-4 grams per liter.

After connecting the mold members 16, 20 together to form the primary mold 15, and after dispensing the chemical composition 11 into the opening 28, the chemical composition 11 is allowed to gradually cool to room temperature. After the chemical composition 11 has cured for approximately 2 hours, the mold members 16, 20 are disconnected and separated so that the phantom 10 may be removed. When the scattering agent 25 is mixed with the thermoplastic elastomers 12, 13, a uniform sonographic image is produced throughout the entire phantom 10. In other instances, it may be desirable to vary the sonographic imaging areas by varying amount of scattering agent 25 in different areas in the phantom 10. For example, additional amounts of scattering agent 25 may be sprinkled into the chemical composition 11 as it is poured into the primary mold 15 to create small areas with contrasting sonographic characteristics. How much scattering agent 25 may be added and where it is added depends on the type of phantom being manufactured. An example where a localized, increased amount of scattering agent 25 is added to a specific region in the phantom 10 is when a dense anthropomorphic imaging structure, such as large muscles or tumors, is mimicked. If additional amounts of scattering agent 25 is sprinkled over large areas of the phantom 10, areas on the phantom 10 where no or small amounts of scattering agent 25 are present may be used to mimic areas that show less sonographic imaging, such as gallbladders, hypoechoic masses, arteries, and ovarian follicles.

One or more long and short conduits may be formed in the phantom 10 to simulate blood vessels and ducts. In the leg phantom 10 shown in FIG. 1, one long conduit 27 is longitudinally aligned and formed inside the phantom 10 that represents the femoral artery. Formed adjacent to the long conduit 27 are two short conduits 33, 33' designed to represent two smaller arteries that extend outward from the femoral artery.

Figure 2:
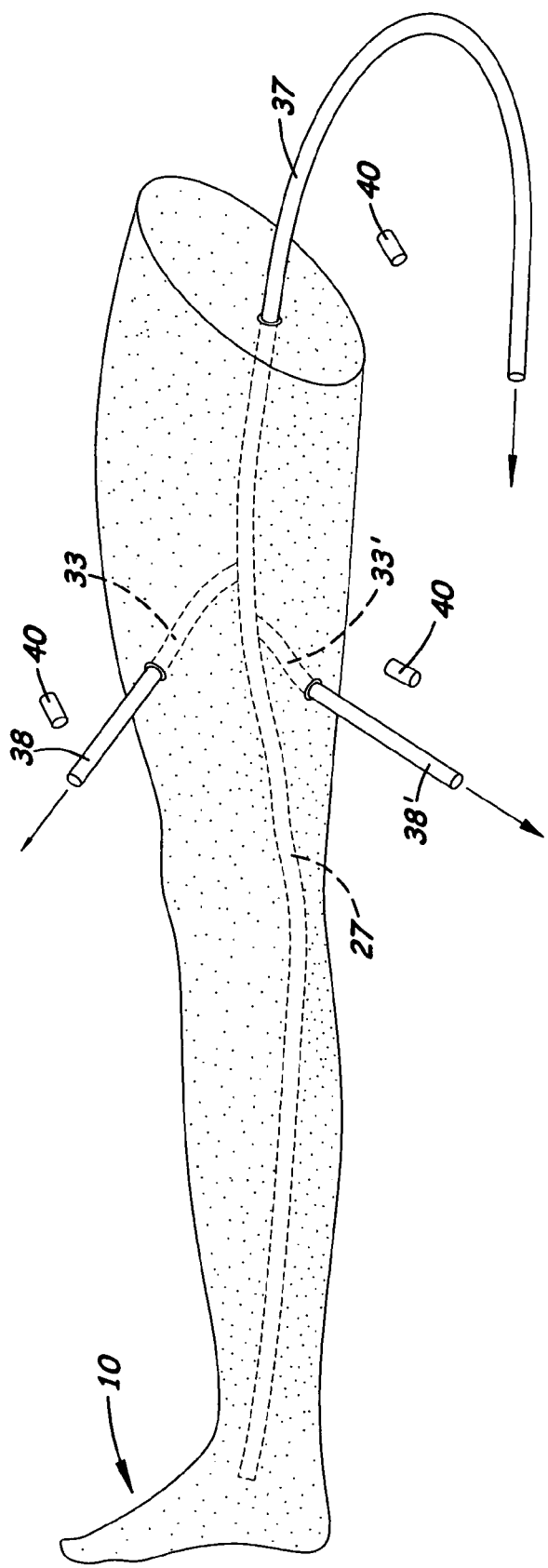
FIG. 2 is a side elevational view of the ultrasonic phantom shown in FIG. 1 showing a long rod and two short rods being removed from the phantom during the manufacturing process.

To manufacture the femoral and branch arteries, a long rod 37 and two short rods 38 and 38' are placed in the primary mold 15. The end of the long rods 37 extend through an opening 22 formed on the end plate 21 on the mold member 20. The short rods 38, 38' are aligned diagonally inside the primary mold 15 with the proximal ends touching the long rod 37 and the distal ends extending through openings 18, 23 formed on the sides of the outer linings 16A, 20A of the two mold members 16, 20. By placing the proximal ends of the short rods 38, 38' adjacent to the long rod 37, long and short conduits 27, 33, 33' appear to be connecting to the long conduit 27. Also, by extending the ends of the rods 37, 38, 38' through the openings 18, 22, 23, the rods 37, 38, 38' can be easily grasped and removed from the phantom 10 after the composition 11 has cured as shown in FIG. 2. In the preferred embodiment, the long and short rods 37, 38, 38" are made of bendable, heat tolerate material that enable them to withstand temperatures used to melt the thermoplastic elastomers 12, 13. An example of material used to produce the rods is a synthetic resinous plastic material sold under the trademark (Delrin™) by E. I. De Pont Nemours and Company, of Wilmington, Del. This particular product is availability in a wide variety of shapes and size and can be easily shaped as necessary to create a desired form.

After the rods 37, 38, 38' have been properly placed in the primary mold 15 and the two mold members 16, 20 have been connected together, the chemical composition 11 is poured into the fill opening 28 to completely fill the inside leg-shaped cavity and to covering the rods 37, 38, and 38'. After the chemical composition 11 has cooled and cured, the rods 37, 38, 38' are removed and the two mold members 16, 20 are disconnected.

In the preferred embodiment, short plugs 40 are placed into the end openings 30, 36, 36' on the conduits 27, 33, 33', respectively. A suitable glue or adhesive 41 may be used to hold the short plugs 40 in the conduits 27, 33, 33'. In the preferred embodiment, the short plugs 40 are made of the chemical composition 11 so that the short plugs 40 blend into the surround phantom 10 and are not visible during the ultrasonic imaging procedure.

In some instances, it is desirable to fill the conduits 27, 33, 33' with a blood-simulating fluid 45. In the preferred embodiment, the blood simulating fluid 45 is made of 20% polyethylene glycol, 79.5% distilled water, 0.5% red food coloring and 0.2% sodium benzoate which acts as a preservative. A red or blue color dye may also be added to the fluid 45 to indicate if the blood vessel is an artery or vein, respectively. The blood-simulating fluid 45 may be injected into the conduits 33, 33' with a suitable syringe and needle. When a large quantity of fluid 45 is needed such as the amount needed to fill the long conduit 27, the fluid 45 may be dispensed via a nozzle 46 connected to a delivery tube 47 and a large volume container.

Figure 3:
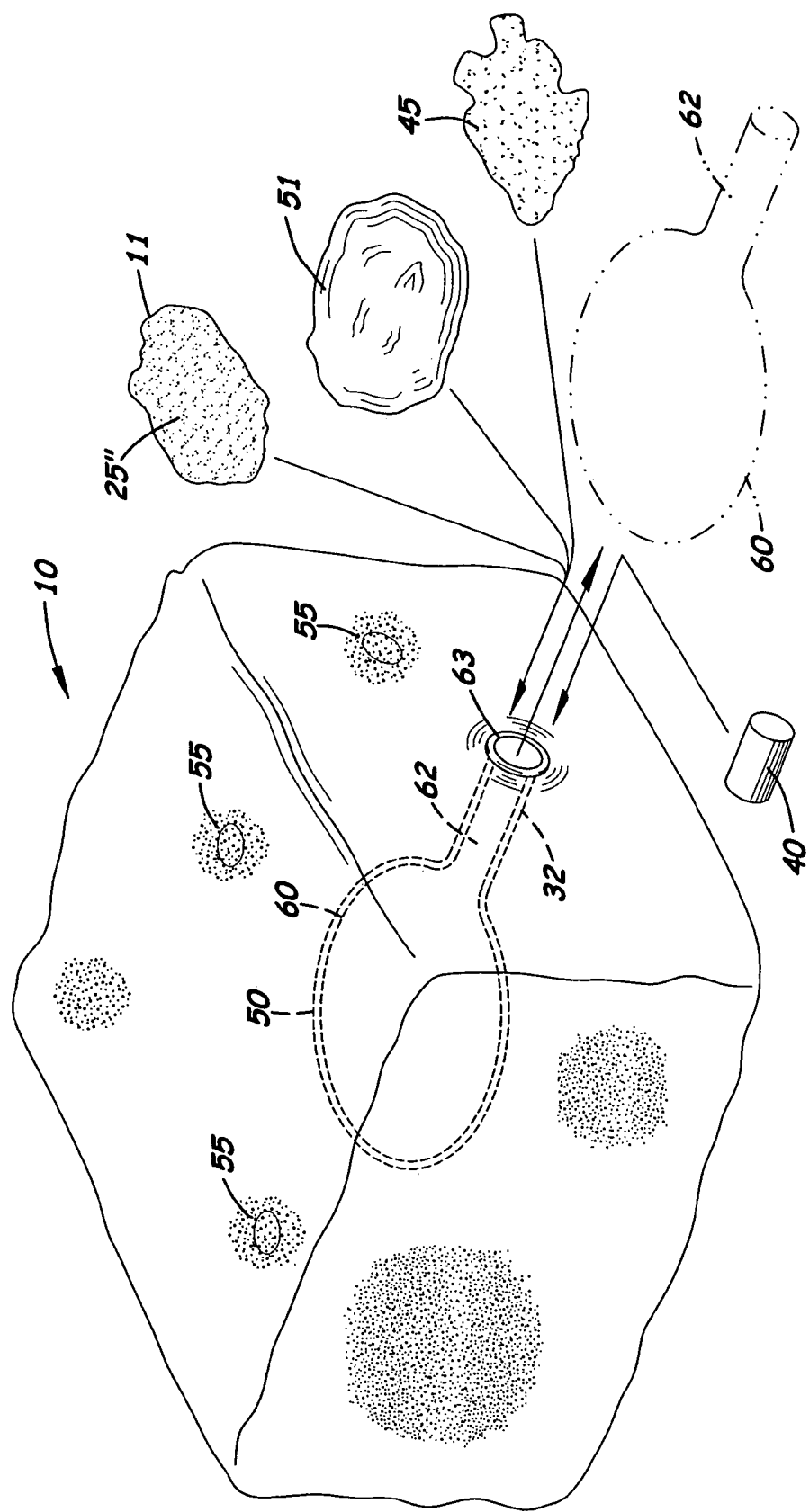
FIG. 3 is a perspective view of a section of the ultrasonic phantom showing the formation of a cavity inside the phantom using a removable secondary mold and various small, hollow and solid objects imbedded in the phantom.
Figure 4:
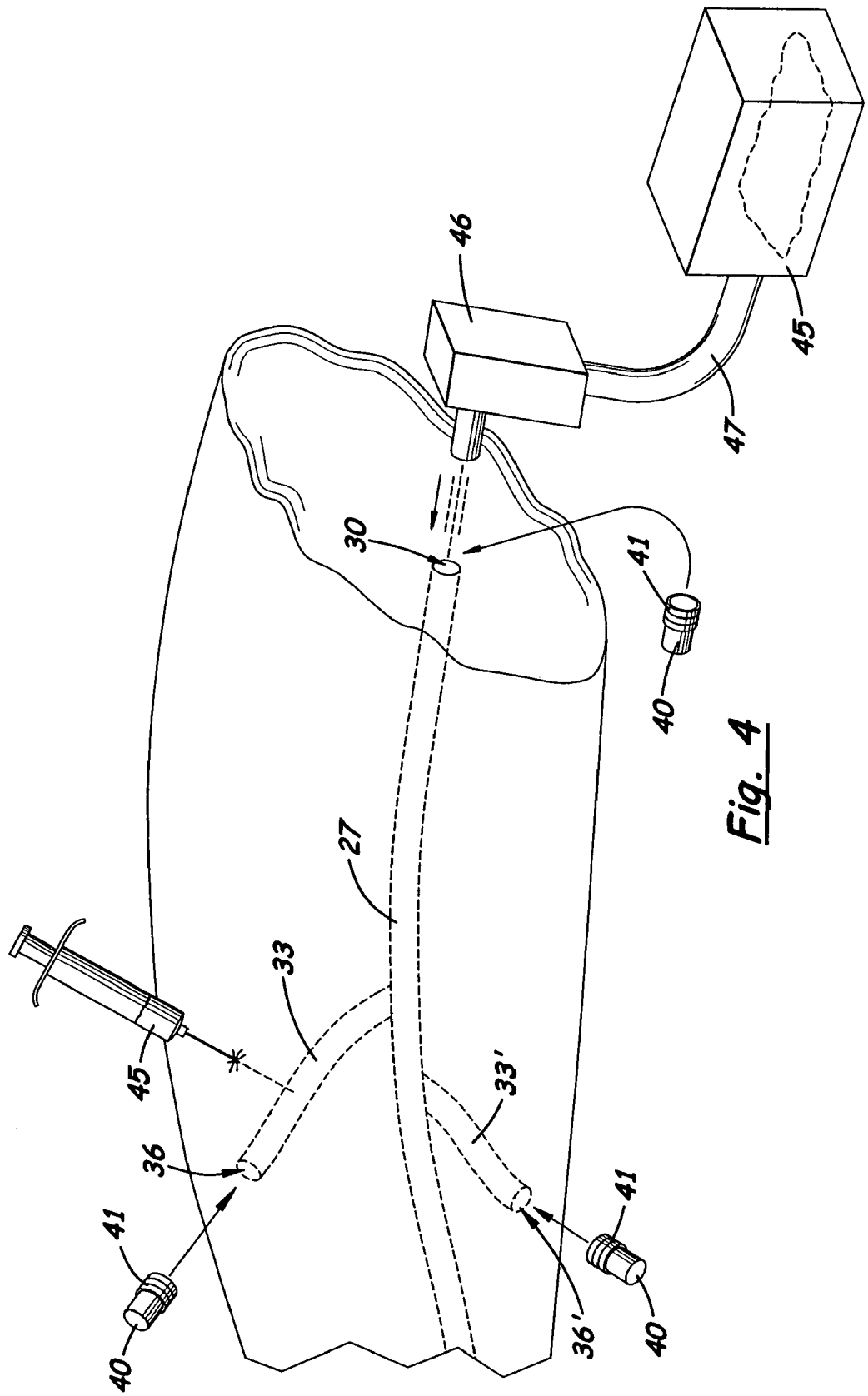
FIG. 4 is a perspective view of the upper section of the leg-shaped phantom shown in FIGS. 1, 2 and 4 showing the ends of the long and short conduits being filled with blood simulating liquid and sealed off with plugs.

As shown in FIG. 3, the phantom 10 may include optional cavities 50 (one shown) that mimic an anthropomorphic cavity in the human tissue. The cavity 50 may be hollow or filled with a solid object 51 or a body fluid simulating liquid, such as fluid 45. Alternatively, the cavity 50 may be filled with molten chemical composition 11 with more or less scattering agent 25" added thereto to provide a contrasting sonographic image.

Also, solid, smaller objects 55, such as glass beads or marbles, may be scattered in the phantom 10 to mimic small tumors, thrombus or calcifications.

To create a large cavity, organ or tumor in the phantom 10, a spherical or oval-shaped secondary mold 60 with a narrow, elongated handle 62 may be placed inside the primary mold 15 at a desired location. The end 63 of the elongated handle 62 is positioned adjacent to the inside surface of the primary mold's outer lining. After the chemical composition 11 has been poured into the primary mold 15 and surrounds the secondary mold 60, the chemical composition 11 is allowed to cure. After curing, the phantom 10 is removed from the primary mold 15. The end of the elongated handle 62 is then pulled to extract the spherical mold 60 from phantom 10 as shown in FIG. 3. The cured chemical composition 11 is sufficiently elastic so that the secondary mold 60 may be pulled from the phantom 10 without tearing or rupturing the phantom 10. A solid object 51 or a blood-simulating fluid 45 may then be deposited in the cavity 50 with a suitable plug 40 made of chemical composition 11 disposed in the opening to the elongated handle space to prevent leakage.

Figure 7:
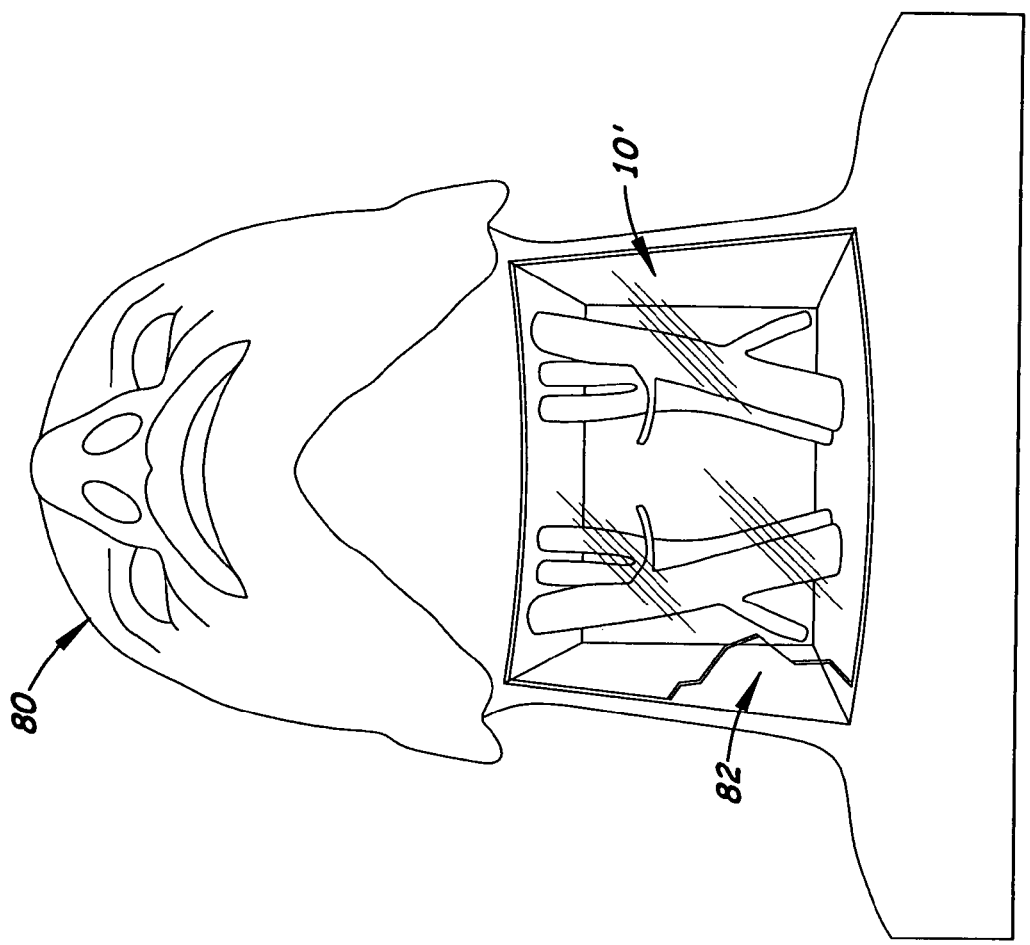
FIG. 7 is a head and neck model with the phantom produced by the primary mold shown in FIG. 6 inserted into the model's phantom cavity.
Figure 6:
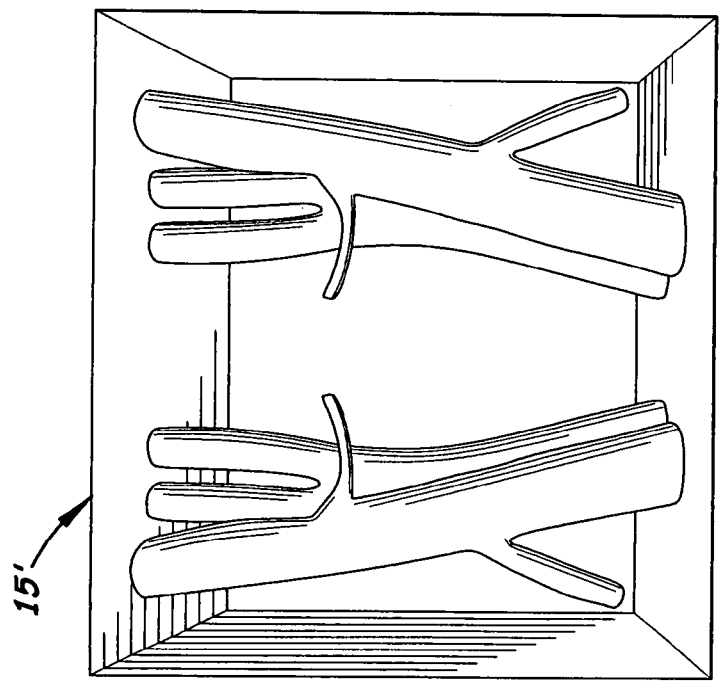
FIG. 6 is a perspective view of the primary mold used to manufacture a phantom that is used with a head and neck model shown in FIG. 7.

In the preferred embodiment, the phantom 10 represents an anatomical structure, such as a leg as shown in FIGS. 1, 2, and 5. In some instances, however, the phantom 11 is designed to represent a section on a rigid model that represents a large anatomical structure. For example, FIG. 6 shows a primary mold 15' used to manufacture a phantom 10' designed to be inserted into the cavity 82 in the head and neck model 80 shown in FIG. 7. Phantom 10' is made of the chemical composition 11 described above with a plurality of long and short conduits 27, 33, 33' formed in the phantom 10' that represents the main blood vessels in the neck.

FIG. 8 shows another primary mold 15" used to manufacture a phantom 10" designed to be inserted into the cavity 92 formed in an arm model 90 shown in FIG. 9. The arm model 90 includes a forearm shaped section 93 with a hand section 94. Extending through the hand section 94 is tubing 95 designed to connect to the long conduit 27 formed in the phantom 10". A pump 100 may be attached to the opposite ends of tubing 102, 104 that connect to the long conduit 27 and tubing 95 that extends through the forearm section 93 and hand section 94 respectfully, to circulate a blood simulating fluid 45 through the arm model 90 during training.

In addition to the above described phantom, a method of manufacturing an ultrasonic imaging phantom is also disclosed which comprises the following steps:

a. forming a primary mold designed to form a human anatomical casting;

b. selecting a suitable volume of thermoplastic elastomers that when heated fills said primary mold;

c. heating the thermoplastic elastomer until melted;

d. selecting one or more sound scattering compounds capable of causing a diffuse scattering pattern in said phantom;

e. mixing said scattering compounds in said melted thermoplastic elastomer;

f. pouring the melted thermoplastic elastomer and scattering agent into said primary mold.

a suitable mold; and, g. removing said phantom from said primary mold.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An anthropomorphic phantom for use with ultrasonic imaging procedure training, comprising;

a. phantom body made of an chemical composition capable of being heated and poured into a primary mold to form a simulated human anatomical structure, said chemical composition when cooled to room temperature being self-sealing when punctured;

b. a scattering agent suspended into said chemical composition to simulate the sonographic characteristics of a human anatomical structure; and, c. at least one blood vessel simulating conduit formed inside said phantom body.

2. The phantom as recited in claim 1, wherein said chemical composition is made of thermoplastic elastomers that are heated, mixed together and then poured into said primary mold.

3. The phantom as recited in claim 2, wherein said thermoplastic elastomers include at least two elastomers from the following group: styrene, ethylene, butylenes, and triblock.

4. The phantom as recited in claim 3, wherein said two thermoplastic elastomers are mixed in a 60:30 ratio.

5. The phantom as recited in claim 1, wherein said scattering agent is talcum powder.

6. The phantom as recited in claim 1, wherein said scattering agent is glass beads.

7. The phantom as recited in claim 2, wherein said scattering agent is talcum powder.

8. The phantom as recited in claim 2, wherein said scattering agent is glass beads.

9. The phantom as recited in claim 1, further including a pigment mixed with said thermoplastic elastomers.

10. The phantom as recited in claim 5 further including a pigment added to said chemical composition.

11. The phantom as recited in claim 6, further including a pigment added to said chemical composition.

12. The phantom as recited in claim 1, further including at least one cavity formed inside said phantom that simulates an internal anatomical cavity or structure.

13. The phantom as recited in claim 12, further including a substance placed inside said cavity that simulates an anatomical substance in an anatomical cavity during an ultrasonic imaging procedure.

14. The phantom as recited in claim 1, wherein said blood simulating blood vessel is filled with substance that simulates anatomical fluid during an ultrasonic imaging procedure.

15. The phantom as recited in claim 14 wherein said blood vessel extends to the outer surface of said phantom and includes a plug that is inserted into the open end of said blood vessel to prevent said fluid from leaking from said vessel.

16. A method of manufacturing an ultrasonic phantom, comprising the following steps:

a. forming a primary mold designed to cast a phantom body of an anatomical object;

b. selecting a suitable volume of a thermoplastic elastomer capable of being heated to fill said primary mold and capable of self-sealing when cooled;

c. heating the thermoplastic elastomer until fluidic;

d. selecting one or more sound scattering compounds capable of causing a diffuse scattering pattern in said phantom during an ultrasonic imaging procedure;

e. mixing said scattering compounds in the melted said thermoplastic elastomer;

f. pouring the melted said thermoplastic elastomer and said scattering agent into said said primary mold;

g. allowing said mold to cool; and, h. removing said phantom from said primary mold.

17. The method of manufacturing an ultrasonic phantom as recited in claim 16, further comprising the step of placing a secondary mold inside said primary mold to form an internal structure inside said phantom.

18. The method of manufacturing an ultrasonic phantom as recited in claim 17, further comprising the step of removing said secondary mold from said phantom to form a hollow cavity or conduit inside said phantom.

19. The method of manufacturing an ultrasonic phantom, as recited in claim 17, further including the step of filling said hollow cavity or conduit with substance that simulates natural substance is said cavity or conduit during an ultrasonic imaging procedure.

20. A method of manufacturing an ultrasonic phantom, comprising the following steps:

a. forming a primary mold designed to cast a phantom body of an anatomical object;

b. selecting at least one secondary mold capable of forming a conduit or cavity in said phantom body;

c. placing said secondary mold inside said primary mold;

d. selecting a suitable volume of ultrasonic simulating tissue material made of thermoplastic material and is self-sealing when cooled;

e. pouring the ultrasonic simulating tissue material into said primary mold and over said secondary mold;

f. allowing said mold to solidify; and, g. removing said secondary mold from said phantom body thereby forming a hollow void or cavity inside said phantom body.

21. The method as recited in claim 20, further including the step of heating said ultrasonic simulating tissue material so form a liquid that can be poured into said primary mold.

22. The method as recited in claim 21, further including the step of adding a scattering agent to said ultrasonic simulating tissue material to simulate natural living tissue during an ultrasonic procedure.

23. The method as recited in claim 20, further including the step of adding an ultrasonic contrasting material to said hollow void or cavity formed inside said phantom body.

* * * * *